W. A. LORENZ.
SELF LOCKING COTTER PIN.
APPLICATION FILED MAR. 4, 1912.
1,056,190. Patented Mar. 18, 1913.
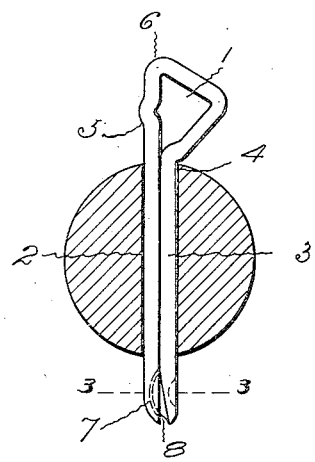
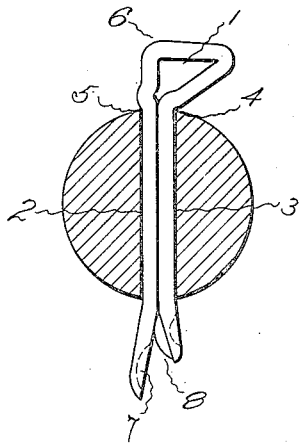
Witnesses:
Inventor:
William A. Lorenz
Harry R. Williams
atty.

UNITED STATES PATENT OFFICE.

WILLIAM A. LORENZ, OF HARTFORD, CONNECTICUT, ASSIGNOR, BY MESNE ASSIGN-
MENTS, TO ANDREW C. CAMPBELL, INCORPORATED, OF WATERBURY, CONNECTI-
CUT, A CORPORATION OF CONNECTICUT.

SELF-LOCKING COTTER-PIN.

1,056,190. Specification of Letters Patent. Patented Mar. 18, 1913.

Application filed March 4, 1912. Serial No. 681,584.

*To all whom it may concern:*

Be it known that I, WILLIAM A. LORENZ, a citizen of the United States, residing at Hartford, in the county of Hartford and State of Connecticut, have invented a new and useful Improvement in Self-Locking Cotter-Pins, of which the following is a specification.

This invention relates to those pins which are designed to be passed through holes for the purpose of preventing the removal of the parts through which they are put, or pieces placed upon the parts through which the pins are thrust.

The object of the invention is to provide a pin of this class which is easy to manufacture, and which is so constructed that after being thrust into the hole, a blow on the end will cause it to automatically lock in place in such manner that it cannot drop or work out. To accomplish this object a length of wire is doubled upon itself so as to form two parallel limbs with an eye at one end. The eye is offset and one limb has, near its end, a projection that extends into a recess in the other limb. When one limb is moved longitudinally with relation to the other limb, by the distortion of the head, the projection rides out of the recess and the ends of the limbs are spread.

In the embodiment of the invention illustrated the limb connected with the offset side of the eye has a projection which normally lies in a recess formed in the limb that is substantially in line with one side of the eye. A blow given to this eye in line with the straight limb drives that limb in and causes the projection on the other limb to ride out of the recess and thus wedge apart the ends of the limbs.

Figure 1 of the accompanying drawings shows a cotter-pin which embodies the invention in its original condition and thrust through a shaft or bar of metal. Fig. 2 is a view of the same after the pin has been fully driven in, and the ends are separated. Fig. 3 is a transverse section taken near the ends of the limb on the plane indicated by the dotted line 3—3 on Fig. 1.

These pins may be made on automatic wire forming machines, of lengths cut from a coil of the commonly used half round stock, of any diameter and the required length. The wire is doubled upon itself to form the eye 1 and bring the flat surfaces together and provide the limbs 2 and 3. In the form of pin shown, the eye is offset on the side of the limb 3 so that the limb 2 is in substantially a straight line with one side of the eye. At the point of junction between the limb 3 and the eye, the stock is preferably bent so as to form a shoulder 4 that will prevent any further inward movement of that limb when the pin is driven into a hole. The side of the eye that forms a continuation of the limb 2 is also desirably bent so as to provide a shoulder 5, which will allow that limb to be driven in a short distance but will limit the inward movement. A blow given to the eye at the bend 6 will be in practically a straight line with the limb 2 and so drive that limb farther through the hole, preferably until the shoulder 5 engages the metal at the end of the hole through which the pin is driven. On account of the shoulder 4, when such a blow is given the limb 3 will be held from inward movement. A blow thus given bends the eye from the shape shown in Fig. 1 to the shape shown in Fig. 2, and forces the limb 2 farther inward through the hole.

In the inside of the limb 2 of the form of pin illustrated near its end a recess 7 is stamped. Near the end of the limb 3 an inward projection 8 is formed by punching. When the pin is in its normal condition, this projection 8 on the inside of the limb 3 lies in the recess 7 on the inside of the limb 2. When the limb 2 is driven inward by a blow at the point 6, as the limb 3 is held from movement, the projection 8 rides out of the recess and causes the ends of the limbs to be spread and thus lock the pin in position. To remove the pin it is only necessary to drive back the limb 2 by a blow on the tip, or to pull this limb back by means of a bar or tool-blade which may be thrust into the eye and twisted. When the limb 2 is forced or drawn back until the projection can again enter the recess, the pin can be removed from the hole.

The invention claimed is:

1. A cotter-pin formed of a piece of wire bent upon itself so as to form an eye and two limbs, one of said limbs, near its end having a projection on its inner side, and the other limb, near its end having a depression on its inner side, the said projection normally occupying said depression, but movable out therefrom for causing the ends of the limbs to separate.

2. A cotter-pin formed of a piece of wire bent upon itself so as to have two parallel limbs and a triangular eye, one of said limbs being a substantially straight line extension of one side of the eye, and the other limb extending at an angle with the other side of the eye, said limbs having on their adjacent surfaces a coöperating projection and depression for causing the ends to be separated when one limb is moved longitudinally with relation to the other.

3. A cotter-pin formed of a piece of wire bent upon itself so as to form an eye and two limbs, one limb having a recess and the other limb having a separating projection lying in said recess, whereby when one limb is moved longitudinally with relation to the other limb, the ends will be spread.

4. A cotter-pin formed of a piece of wire bent upon itself so as to have two integral limbs, one limb being substantially straight and the other limb being bent out at an acute angle from and back at an acute angle toward the straight limb and forming a triangular eye at the head end of the pin, and a part of one limb extending transversely into the path of the other limb, whereby a blow given to the head will drive the straight limb longitudinally and cause the other limb to become more bent at the outer angle and the driving longitudinally of the straight limb will cause the free ends of the limbs to be separated.

5. A cotter-pin formed of a piece of wire bent upon itself so as to form an angular eye and two limbs, one limb on its inner side having a recess and the other limb on its inner side having a projection that normally lies in the recess, said projection being movable out of said recess when one limb is moved longitudinally with relation to the other and thus causing a spreading of said limbs.

6. A cotter-pin formed of a piece of wire bent upon itself so as to have two parallel limbs with means whereby the movement of one limb longitudinally with relation to the other will cause the limbs to be separated and a triangular eye, said eye having one side bent at an angle with relation to one limb and having the other side in a straight line with relation to the other limb, with shoulders formed on the sides of the eye which limit the movement thereof when the limbs are driven into a hole.

7. A cotter-pin formed of a piece of wire bent upon itself to provide two limbs and an eye, one side of said eye being bent at an angle with one of the limbs and provided with a shoulder which will prevent that limb from being driven farther into a hole, and the other side of the eye being substantially straight with relation to the other limb and provided with a shoulder which allows a limited movement inward into a hole of that other limb, one of said limbs having a recess and the other having a projection normally occupying said recess whereby the inward movement of the limb that is straight with one side of the eye will cause a spreading of the ends of the limbs for locking the pin in place.

WILLIAM A. LORENZ.

Witnesses:
EDWARD H. LORENZ,
NELLIE PHOENIX.